(12) United States Patent
Jebbar et al.

(10) Patent No.: US 10,466,998 B2
(45) Date of Patent: Nov. 5, 2019

(54) MODEL BASED UPGRADE CAMPAIGN GENERATION

(71) Applicants: TELEFONAKTIEBOLAGET LM ERICSSON (PUBL), Stockholm (SE); Oussama Jebbar, Montreal (CA); Margarete Sackmann, Munich (DE); Maria Toeroe, Montreal (CA); Ferhat Khendek, Montreal (CA)

(72) Inventors: Oussama Jebbar, Montreal (CA); Margarete Sackmann, Munich (DE); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/071,034

(22) PCT Filed: Feb. 17, 2016

(86) PCT No.: PCT/IB2016/050861
§ 371 (c)(1),
(2) Date: Jul. 18, 2018

(87) PCT Pub. No.: WO2017/141072
PCT Pub. Date: Aug. 24, 2017

(65) Prior Publication Data
US 2019/0026097 A1    Jan. 24, 2019

(51) Int. Cl.
*G06F 8/65* (2018.01)
*G06F 8/76* (2018.01)
(Continued)

(52) U.S. Cl.
CPC .............. *G06F 8/65* (2013.01); *G06F 8/433* (2013.01); *G06F 8/656* (2018.02); *G06F 8/658* (2018.02);
(Continued)

(58) Field of Classification Search
CPC ..................................... G06F 8/65; G06F 8/76
(Continued)

(56) References Cited

U.S. PATENT DOCUMENTS

| 8,434,066 B2 * | 4/2013 | Sharma ...................... G06F 8/38 717/126 |
| 2006/0168575 A1 * | 7/2006 | Bhatt ........................ G06F 8/65 717/168 |

(Continued)

FOREIGN PATENT DOCUMENTS

WO    2015/132634 A1    9/2015

OTHER PUBLICATIONS

Davoudian, Ali et al.: "Ordering Upgrade Changes for Highly Available Component Based Systems"; Mar. 3, 2014; 2 pages.

*Primary Examiner* — Qing Chen
*Assistant Examiner* — Clint Thatcher
(74) *Attorney, Agent, or Firm* — Sage Patent Group

(57) ABSTRACT

An upgrade campaign is generated for entities of a system described by a source configuration. According to the upgrade campaign, the system is upgraded to a target configuration using available software. A change model describes changes from the source configuration to the target configuration. According to the change model, an upgrade campaign specification model is generated, which contains at least one upgrade campaign element for each change in the change model. A subset of upgrade campaign elements are matched based on a first set of rules, and the matched upgrade campaign elements are merged into an upgrade procedure in the upgrade campaign specification model. The upgrade procedures are ordered based on a second set of rules and dependencies among the entities of the system, where the dependencies are extracted from the source configuration, the target configuration and the description of available software.

23 Claims, 11 Drawing Sheets

(51) Int. Cl.
  *G06F 8/656* (2018.01)
  *G06F 8/658* (2018.01)
  *G06F 8/41* (2018.01)
  *G06F 9/445* (2018.01)
  *G06F 8/61* (2018.01)

(52) U.S. Cl.
  CPC ...... *G06F 9/44505* (2013.01); *G06F 9/44536* (2013.01); *G06F 8/61* (2013.01); *G06F 8/76* (2013.01)

(58) Field of Classification Search
  USPC .......................................................... 717/168
  See application file for complete search history.

(56) References Cited

U.S. PATENT DOCUMENTS

| | | | |
|---|---|---|---|
| 2009/0265699 A1* | 10/2009 | Toeroe | G06F 8/65 717/168 |
| 2010/0235479 A1* | 9/2010 | Toeroe | G06F 8/656 709/221 |
| 2011/0035738 A1* | 2/2011 | Toeroe | G06F 8/65 717/168 |
| 2011/0078211 A1 | 3/2011 | Gass et al. | |
| 2014/0258999 A1* | 9/2014 | Katihar | G06F 8/65 717/168 |
| 2014/0259002 A1* | 9/2014 | Davoudian | G06F 8/65 717/172 |
| 2014/0304701 A1* | 10/2014 | Zhang | G06F 8/61 717/174 |

* cited by examiner

Upgrade Campaign Specification Metamodel
400

Change Metamodel
500

MODEL BASED UPGRADE CAMPAIGN GENERATION

TECHNICAL FIELD

Embodiments of the disclosure relate generally to systems and methods for managing a high availability system.

BACKGROUND

An upgrade campaign is the process of migrating a system from one configuration to another. In Service Availability Forum (SAF) compliant systems, Software Management Framework (SMF) is the engine responsible for the orchestration of such migration. To perform the changes, SMF takes an input consisting of an upgrade campaign specification file, which contains different actions to perform system changes. When designing an upgrade campaign, the campaign designer can face several challenges because of the complexity and the size of the system, and the effect that these two attributes have on the amount of actions to take the system from one state to another.

When upgrading a safety critical or highly-available (HA) system (i.e. a system that needs to be running 99.999% of the time, for example), an administrator has at least two main concerns. The first concern is the correctness of the upgrade. Correctness means that the instructions passed to the upgrade engine are performing the necessary changes to achieve the target configuration. The second concern is to minimize the outage and service disruption. In safety critical or HA systems, service disruption or outage can be very costly. While system upgrades are necessary for maintenance purposes, they are considered one of the main causes of outage.

Designing an upgrade campaign is a complex and error prone task. The task becomes even more difficult in the cloud context where there are many complex systems.

SUMMARY

In one embodiment, a method is provided for generating an upgrade campaign for entities of a system described by a source configuration to upgrade the system to a target configuration using available software. The method comprises: generating an upgrade campaign specification model to describe the upgrade campaign according to a change model which describes changes from the source configuration to the target configuration, wherein the upgrade campaign specification model contains at least one upgrade campaign element for each change in the change model; matching subset of upgrade campaign elements based on a first set of rules to form one or more matched groups of upgrade campaign elements; merging each matched group of upgrade campaign elements into an upgrade procedure in the upgrade campaign specification model; extracting dependencies among the entities of the system from the source configuration, the target configuration and the description of available software; and ordering the upgrade procedures based on the extracted dependencies and a second set of rules.

In another embodiment, there is provided a network node comprising processing circuitry and memory. The memory contains instructions executable by the processing circuitry to generate an upgrade campaign for entities of a system described by a source configuration to upgrade the system to a target configuration using available software. The network node is operative to: generate an upgrade campaign specification model to describe the upgrade campaign according to a change model which describes changes from the source configuration to the target configuration, wherein the upgrade campaign specification model contains at least one upgrade campaign element for each change in the change model; match subset of upgrade campaign elements based on a first set of rules to form one or more matched groups of upgrade campaign elements; merge each matched group of upgrade campaign elements into an upgrade procedure in the upgrade campaign specification model; extract dependencies among the entities of the system from the source configuration, the target configuration and the description of available software; and order the upgrade procedures based on the extracted dependencies and a second set of rules.

In another embodiment, there is provided a server instance, in a cloud computing environment providing processing circuitry and memory. The memory contains instructions executable by the processing circuitry to generate an upgrade campaign for entities of a system described by a source configuration to upgrade the system to a target configuration using available software. The server instance is operative to: generate an upgrade campaign specification model to describe the upgrade campaign according to a change model which describes changes from the source configuration to the target configuration, wherein the upgrade campaign specification model contains at least one upgrade campaign element for each change in the change model; match subset of upgrade campaign elements based on a first set of rules to form one or more matched groups of upgrade campaign elements; merge each matched group of upgrade campaign elements into an upgrade procedure in the upgrade campaign specification model; extract dependencies among the entities of the system from the source configuration, the target configuration and the description of available software; and order the upgrade procedures based on the extracted dependencies and a second set of rules.

In yet another embodiment, there is provided a method for generating an upgrade campaign for entities of a system described by a source configuration to upgrade the system to a target configuration using available software. The method is performed by a server instance, in a cloud computing environment providing processing circuitry and memory. The memory contains instructions executable by the processing circuitry to perform the method comprising: generating an upgrade campaign specification model to describe the upgrade campaign according to a change model which describes changes from the source configuration to the target configuration, wherein the upgrade campaign specification model contains at least one upgrade campaign element for each change in the change model; matching subset of upgrade campaign elements based on a first set of rules to form one or more matched groups of upgrade campaign elements; merging each matched group of upgrade campaign elements into an upgrade procedure in the upgrade campaign specification model; extracting dependencies among the entities of the system from the source configuration, the target configuration and the description of available software; and ordering the upgrade procedures based on the extracted dependencies and a second set of rules.

In yet another embodiment, there is provided a network node operable to generate an upgrade campaign for entities of a system described by a source configuration to upgrade the system to a target configuration using available software. The network node comprises: an upgrade campaign generator module adapted to generate an upgrade campaign specification model to describe the upgrade campaign according to a change model which describes changes from the source configuration to the target configuration, wherein the upgrade campaign specification model contains at least one upgrade campaign element for each change in the change model; a matching module adapted to match subset of upgrade campaign elements based on a first set of rules to form one or more matched groups of upgrade campaign elements; a merging module adapted to merge each matched group of upgrade campaign elements into an upgrade procedure in the upgrade campaign specification model; a dependencies extraction module adapted to extract dependencies among the entities of the system from the source configuration, the target configuration and the description of available software; and an ordering module adapted to order the upgrade procedures based on the extracted dependencies and a second set of rules.

In another embodiment there is provided a method for generating an upgrade campaign for entities of a system described by a source configuration to upgrade the system to a target configuration using available software. The method comprises initiating an instantiation of a server instance in a cloud computing environment which provides processing circuitry and memory for running the server instance. The server instance is operative to generate an upgrade campaign specification model to describe the upgrade campaign according to a change model which describes changes from the source configuration to the target configuration, wherein the upgrade campaign specification model contains at least one upgrade campaign element for each change in the change model; match subset of upgrade campaign elements based on a first set of rules to form one or more matched groups of upgrade campaign elements; merge each matched group of upgrade campaign elements into an upgrade procedure in the upgrade campaign specification model; extract dependencies among the entities of the system from the source configuration, the target configuration and the description of available software; and order the upgrade procedures based on the extracted dependencies and a second set of rules.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

DETAILED DESCRIPTION

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

Systems, apparatuses and methods based on model driven techniques for generating upgrade campaign specifications are provided herein. The model driven techniques are used to increase the level of abstraction and to ease transformations for HA systems such as SAF systems. To minimize system outage caused by a system upgrade, one goal of the upgrade is to correctly handle the following aspects: (1) Dependencies: The building blocks of a system may depend on each other, and upgrading one component may impact another. The dependencies may impact the ordering of the changes performed to the system configuration. (2) Multiple versions: During the upgrade of an HA system's service, multiple versions of the same software may co-exist in the system and need to collaborate in a seamless transfer of the services from one version to another. (3) Upgrade methods: SAF specifications define two upgrade methods: rolling upgrade and single step upgrade. Applying an incorrect upgrade method can cause unnecessary outage. (4) Upgrade scope: Choosing an appropriate upgrade scope can significantly reduce service outage and disruption induced by an upgrade campaign.

Figure 1:
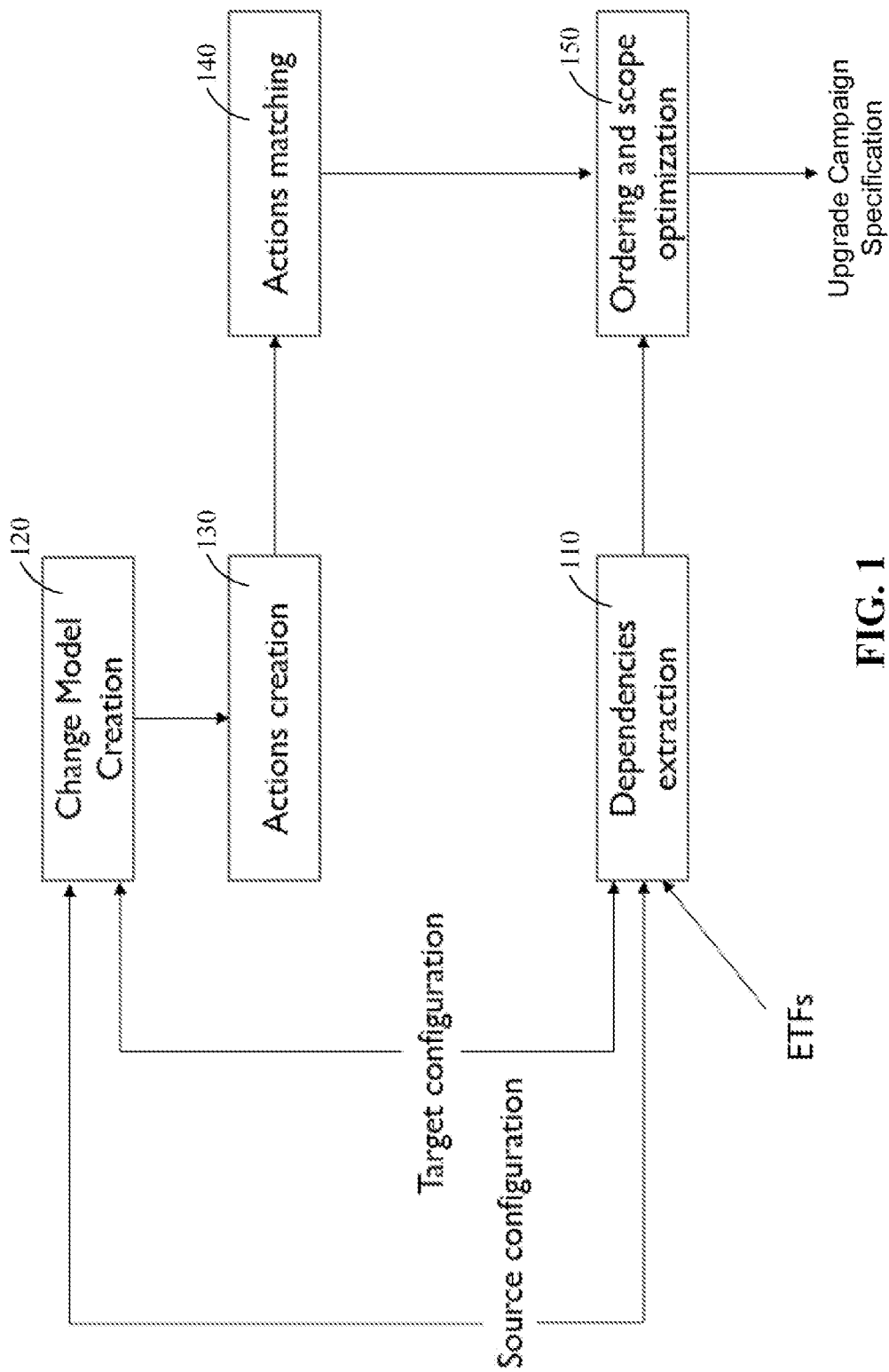
FIG. 1 illustrates five model transformations for generating an upgrade campaign according to one embodiment.

FIG. 1 illustrates five model transformations for generating an upgrade campaign according to one embodiment. The five model transformations include: dependencies extraction 110, change model creation 120, actions creation 130, actions matching 140, and ordering and scope optimization 150. Each transformation takes one or more input models and produces an output model. The output model serves as input for the next transformation until the final transformation produces the upgrade campaign specification. In one embodiment, the main input models for the upgrade campaign specification generation include: source configuration, target configuration and Entity Types Files (ETFs). The source configuration describes the system in its current state. The target configuration describes the state of the system after the upgrade campaign is executed. In one embodiment, each of the source configuration and the target configuration is an instance of the standard Availability Management Framework (AMF) configuration model, which may be defined in Unified Modeling Language (UML). The ETFs describe the software available in the software repository, which includes the software bundles deployed and to be deployed in the system and the entity types provided by the software bundles. In one embodiment, the ETF is an instance of the standard ETF model defined in the Extensible Markup Language (XML) Schema Definition (XSD).

The first transformation, dependencies extraction 110, receives the three input models (i.e., source configuration, target configuration and ETF) and extracts the dependencies among the system's entities into a dependencies model. The second transformation, change model creation 120, creates a change model describing the changes to be performed on the source configuration to result in the target configuration. The third transformation, actions creation 130, generates an elementary upgrade campaign specification model from the change model. The elementary upgrade campaign specification model contains at least one upgrade campaign element for each change in the change model. The fourth transformation, actions matching 140, matches the upgrade campaign elements that can be performed in the same upgrade procedure and merges these matched upgrade campaign elements into an upgrade procedure. The elements that are not needed any more are deleted from the upgrade campaign specification model. Finally, the fifth transformation, ordering and scope optimization 150, refines the resulting upgrade campaign specification model. The fifth transformation uses the extracted dependencies to create a partial order of the upgrade procedures and to determine the optimal scope for each upgrade procedure.

Figure 2:
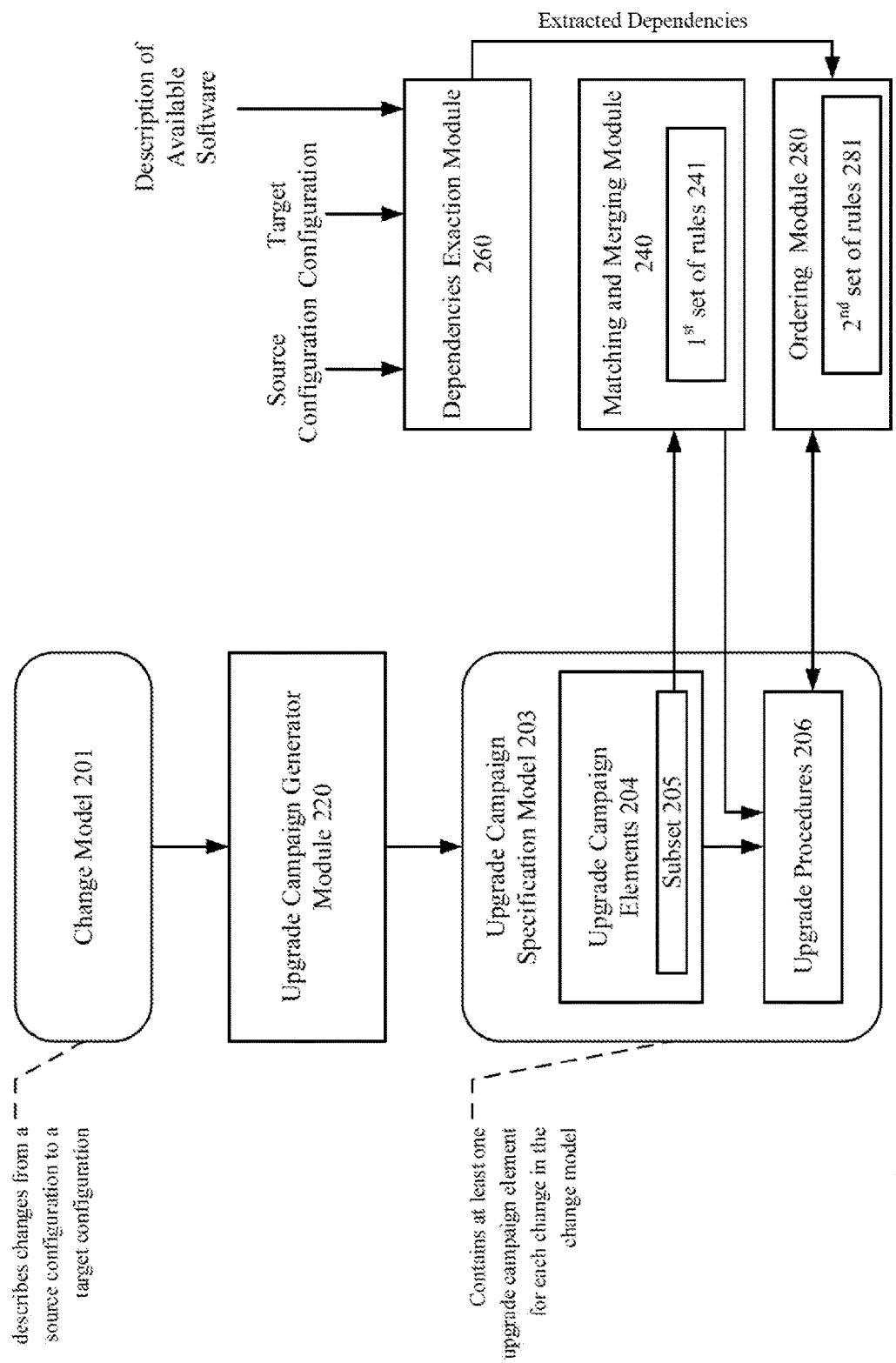
FIG. 2 illustrates a process for generating an upgrade campaign specification model that describes an upgrade campaign according to one embodiment.

FIG. 2 illustrates a process 200 for generating an upgrade campaign specification model that describes an upgrade campaign according to one embodiment. In one embodiment, the process 200 includes the five transformations 110-150 of FIG. 1; in an alternative embodiment, the process 200 may include only some of the transformations 110-150 and receive the results of some other of the transformations 110-150 as an input to the process 200. For example, the change model may be received by the process 200 as input. The process 200 may be performed as a method shown in FIG. 3, which is a flow diagram illustrating a method 300 for generating an upgrade campaign according to one embodiment.

Figure 3:
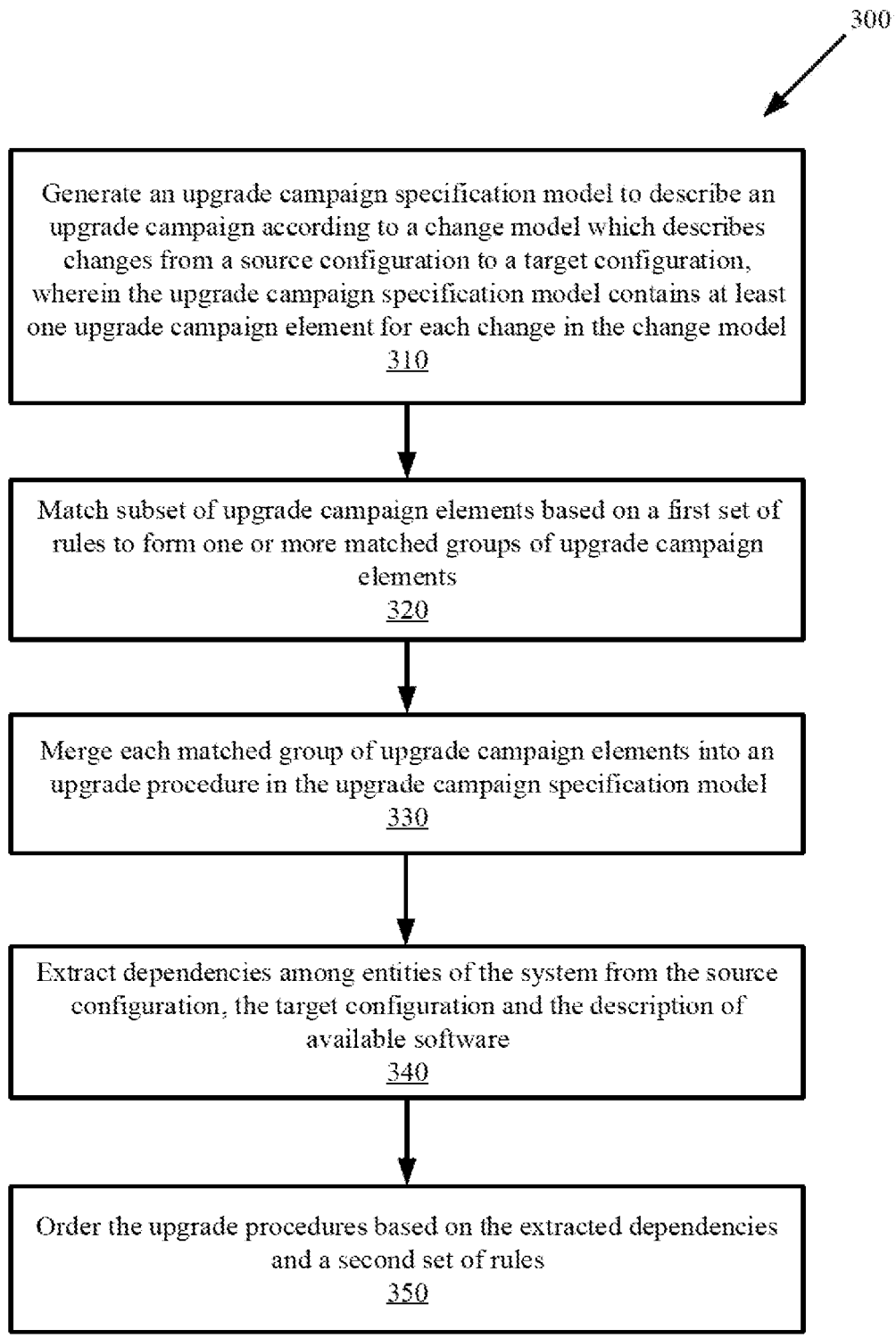
FIG. 3 is a flow diagram illustrating a method for generating an upgrade campaign according to one embodiment.

Referring to FIG. 2 and FIG. 3, an upgrade campaign is generated for entities of a system described by a source configuration to upgrade the system to a target configuration, using available software for deployment in the system. The method 300 begins with step 310 at which an upgrade campaign generator module 220 (FIG. 2) generates an upgrade campaign specification model 203 describing the upgrade campaign according to a change model 201. The change model 201 describes changes from the source configuration to the target configuration. The change model 201 may be an input, or may be calculated from the source configuration and a description of the new software to be deployed in the system. Alternatively, the change model 201 may be calculated from the differences between the source configuration and the target configuration. The upgrade campaign specification model 203 contains at least one upgrade campaign element 204 for each change in the change model 201.

The method 300 proceeds to step 320, at which a matching and merging module 240 matches a subset 205 of the upgrade campaign elements based on a first set of rules 241 to form one or more matched groups of upgrade campaign elements. At step 330, the matching and merging module 240 merges each matched group of upgrade campaign elements into an upgrade procedure 206 in the upgrade campaign specification model 203. At step 340, a dependencies extraction module 260 extracts dependencies among the entities of the system from the source configuration, the target configuration and the description of available software; e.g. the ETFs. At step 350, an ordering module 280 orders the upgrade procedures 206 based on the extracted dependencies and a second set of rules 281.

It is understood that the steps 310-350 of the method 300 may be executed in a different order from what is shown in FIG. 3. For example, step 340 at which the dependencies are extracted may be executed before step 310 at which the upgrade campaign specification model 203 is generated. Moreover, the modules of FIG. 2 correspond to the transformations of FIG. 1. For example, the upgrade campaign generator module 220 corresponds to the actions creation 130, the matching and merging module 240 corresponds to the actions matching 140, the dependencies extraction module 260 corresponds to the dependencies extraction 110, and the ordering module 280 corresponds to the ordering and optimization 150.

Figure 4:
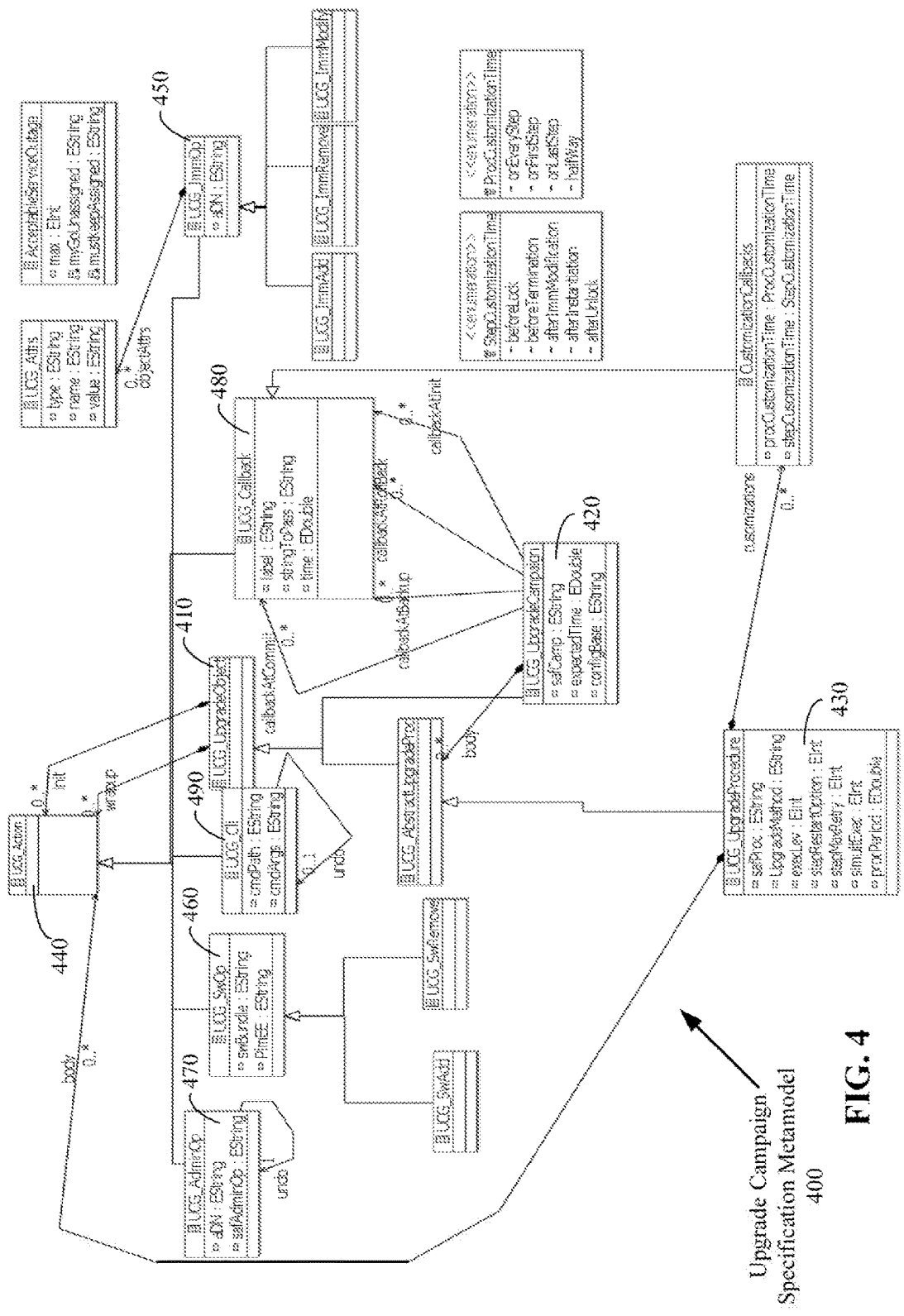
FIG. 4 illustrates an upgrade campaign specification metamodel according to one embodiment.
Figure 5:
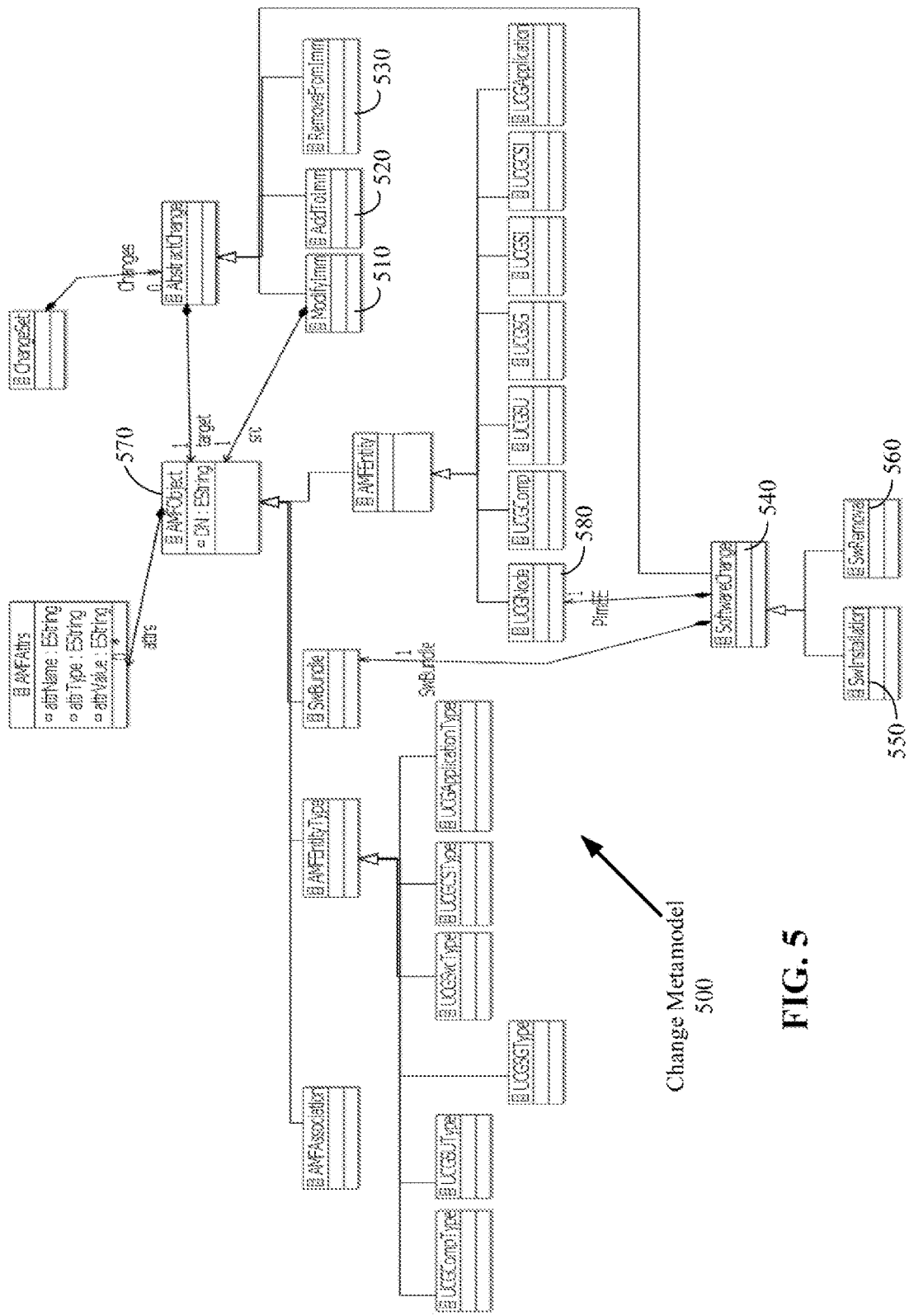
FIG. 5 illustrates a change metamodel according to one embodiment.
Figure 6:
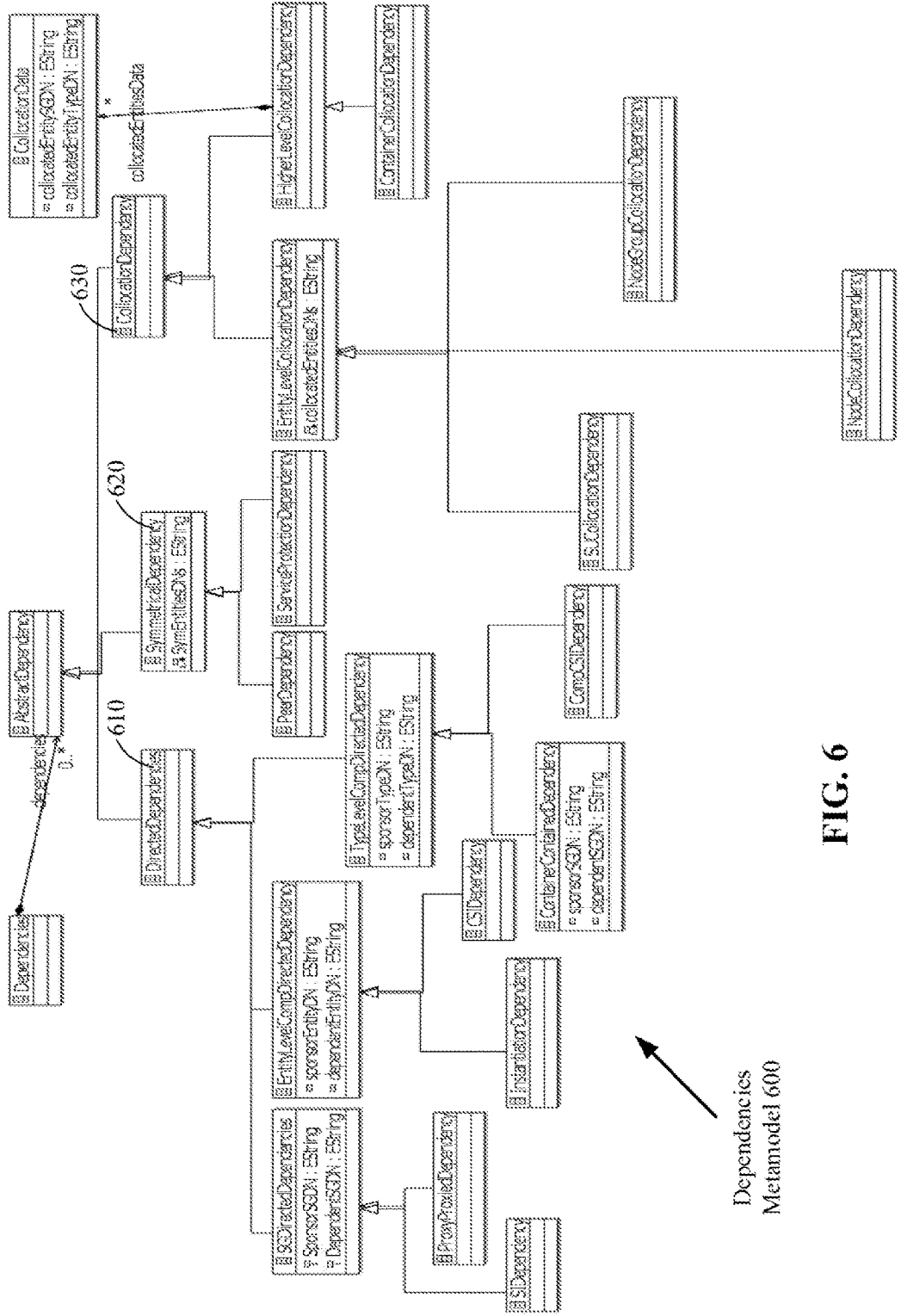
FIG. 6 illustrates a dependencies metamodel according to one embodiment.

The following description explains the logic of each of the transformations 110-150 of FIG. 1, as well as the process 200 of FIG. 2 and the method 300 of FIG. 3. FIGS. 4-6 illustrate the metamodels to which the outputs of the transformations 110-150 conform. The metamodels include a dependencies metamodel, a change metamodel and an upgrade campaign specification metamodel.

FIG. 4 illustrates an upgrade campaign specification metamodel 400 according to one embodiment. The upgrade campaign specification metamodel 400 captures the data for generating a SAF compliant upgrade campaign specification. The metamodel 400 is described using upgrade objects (UCG_UpgradeObject 410). Every upgrade object is defined through the definition of its initialization, body, and wrap-up sections.

The main upgrade objects (UCG_UpgradeObject 410) that are used to specify an upgrade campaign include: the upgrade campaign (UCG_UpgradeCampaign 420), which is the root element of the upgrade campaign specification; and the upgrade procedure (UCG_UpgradeProcedure 430), which composes the upgrade campaign's body specifying how a set of changes is to be deployed.

As mentioned, the upgrade campaign body is composed of upgrade procedures, while the upgrade procedure body is composed of an upgrade step description. An upgrade step description is an ordered list of upgrade actions (UCG Action 440) and target entities. This list of upgrade actions may be repeated for different subsets of the target entities.

The initialization and the wrap-up sections of the upgrade object are also composed of ordered upgrade actions. An upgrade action can be any of the following: (1) An information model related operation, e.g. the Information Model Management (IMM) related operation (UCG_ImmOp 450), such as addition, removal or modification of an object in IMM. (2) A software related action (UCG_SwOp 460), such as installations and removals, which are usually called based on the software bundle's Distinguished Name (DN) and the node on which an installation is to be performed (PlmEE). (3) An administrative operation (UCG_AdminOp 470), such as Lock, Unlock, Lock-Instantiation, and Unlock-Instantiation defined in the AMF standard. These operations are called on objects based on their DNs, and for every administrative operation it is defined how the operation is performed in the direct execution and in rollback (i.e. doing and undoing of the administrative operation). (4) Callback (UCG_Callback 480), which calls on entities deployed in the system based on their DNs. (5) A CLI Command (UCG_Cli 490), which is a command called using the Command Line Interface (CLI), and specified using the path of the command and its arguments. For each command, it is specified how the command is called in the execution and in the rollback paths (i.e. doing and undoing of the command).

While software related actions can only be part of a procedure body, the other four actions can be used in the initialization and wrap-up sections as well the procedure body.

FIG. 5 illustrates a change metamodel 500 according to one embodiment. The change model 500 describes the changes performed on the system to upgrade the system from one state (i.e. the source configuration) to the other (i.e. the target configuration). These changes can be either IMM related changes (ModifyImm 510, AddToImm 520, RemoveFromImm 530) or software related changes (SoftwareChange 540). The software related changes (SoftwareChange 540) include the installation (SwInstallation 550) and removals (SwRemoval 560) of software bundles from a set of nodes (UCGNode 580). The IMM related changes can be addition to (AddToImm 520), removal from (RemoveFromImm 530) or modification of (ModifyImm 510) the existing content of IMM.

A removal from IMM can be performed based on the DN of the object to be deleted. An addition, on the other hand, needs all the attributes of the object to be added. This is why every AMF object (AMFObject 570) is mapped to a set of attributes characterized by a name, type and value. For modifications, the source object and target object are compared to determine which attributes are to be modified.

Furthermore, AMF entities and AMF entity types are distinguished as targets of a change, so that appropriate upgrade actions can be placed in the appropriate upgrade campaign specification (e.g. initialization, wrap-up, or procedure body).

FIG. 6 illustrates a dependencies metamodel 600 according to one embodiment. The dependencies metamodel 600 captures different dependencies that may exist between deployed components as well as AMF logical entities. These dependencies can be used for different purposes depending on their categories. Directed dependencies 610 describe the dependencies between dependent entities and the entities being depended on, and can be used to order the changes. The ordering of the changes will be described in more details later in the disclosure. Symmetrical dependencies 620 describe the dependencies between entities that depend on each other, and can be used to handle compatibility and service protection issues. This provides significant insight on what upgrade method to choose (rolling upgrade or single step upgrade). Collocation dependencies 630 describe the dependencies between entities that are collocated on a same entity, and can be used both to improve the choice of the upgrade method and to determine which procedures can be merged with each other.

The following description explains each of the transformations 110-150 of FIG. 1 in detail. In the dependencies extraction 110, the different dependencies are extracted from the ETFs, the source configuration and the target configuration between the system's entities based on their attributes and the way they are deployed. The different dependencies that can be extracted include the following:

SI dependency, which is between two SGs. One of them (Sponsor SG) protects a Sponsor SI and the other (Dependent SG) protects a Dependent SI.

Proxy-Proxied dependency, which is between two SGs. One of them (Sponsor SG) protects a Proxy SI, and the other (Dependent SG) protects its Proxied SI.

Instantiation dependency, which is between a pre-instantiable component of a SU (Sponsor), and another pre-instantiable component of the same SU with a lower instantiation level (Dependent). A lower instantiation level means that the component is instantiated later, i.e. after all components with a higher instantiation level have been instantiated.

CSI dependency, which is between CSIs of the same SI. A sponsor CSI is to be assigned before a dependent CSI.

Container-Contained dependency, which is between a sponsor component and a dependent component. The sponsor and the dependent are characterized based on their SG and type, meaning that components belonging to the SG SponsorSG and of type SponsorType are containers of components of the SG dependent SG and of type DependentType.

CompCSIDependency, which is the instantiation dependency version for non-pre-instantiable components. It exists between components of the same SU, and means that components of the SU of type DependentType depend on components of the same SU that are of type SponsorType. This dependency imposes only a partial order, since this dependency exists between two types if and only if none of the CSIs handled by the SponsorType depend on any of the CSIs handled by the DependentType, and all the CSIs handled by the DependentType depend on at least one of the CSIs handled by the SponsorType. In this case an ordering can be deduced for the changes on the components of that SU; otherwise they are upgraded all at once, taking as AU/DU at least to the SU level (no restartability option).

SU collocation dependency, which exists between components sharing the same SU.

Node collocation dependency, which exists between SUs configured for the same Node, or SGs having a Node in common.

NodeGroup collocation dependency, which exists between SGs sharing the same NodeGroup.

Container collocation dependency, which is derived from container-contained dependency, and identifies the pairs (dependent type, dependent SG) that share the same pair (sponsor type, sponsor SG).

Service protection dependency, which exists between SUs of the same SG. The SUs of the same SG provide and protect all the SIs it is configured for.

Peer dependency, which exists between components of different SUs that provide the same CS type. They depend on each other through the collaboration when servicing the active and standby assignments of the same CSI.

Figure 7:
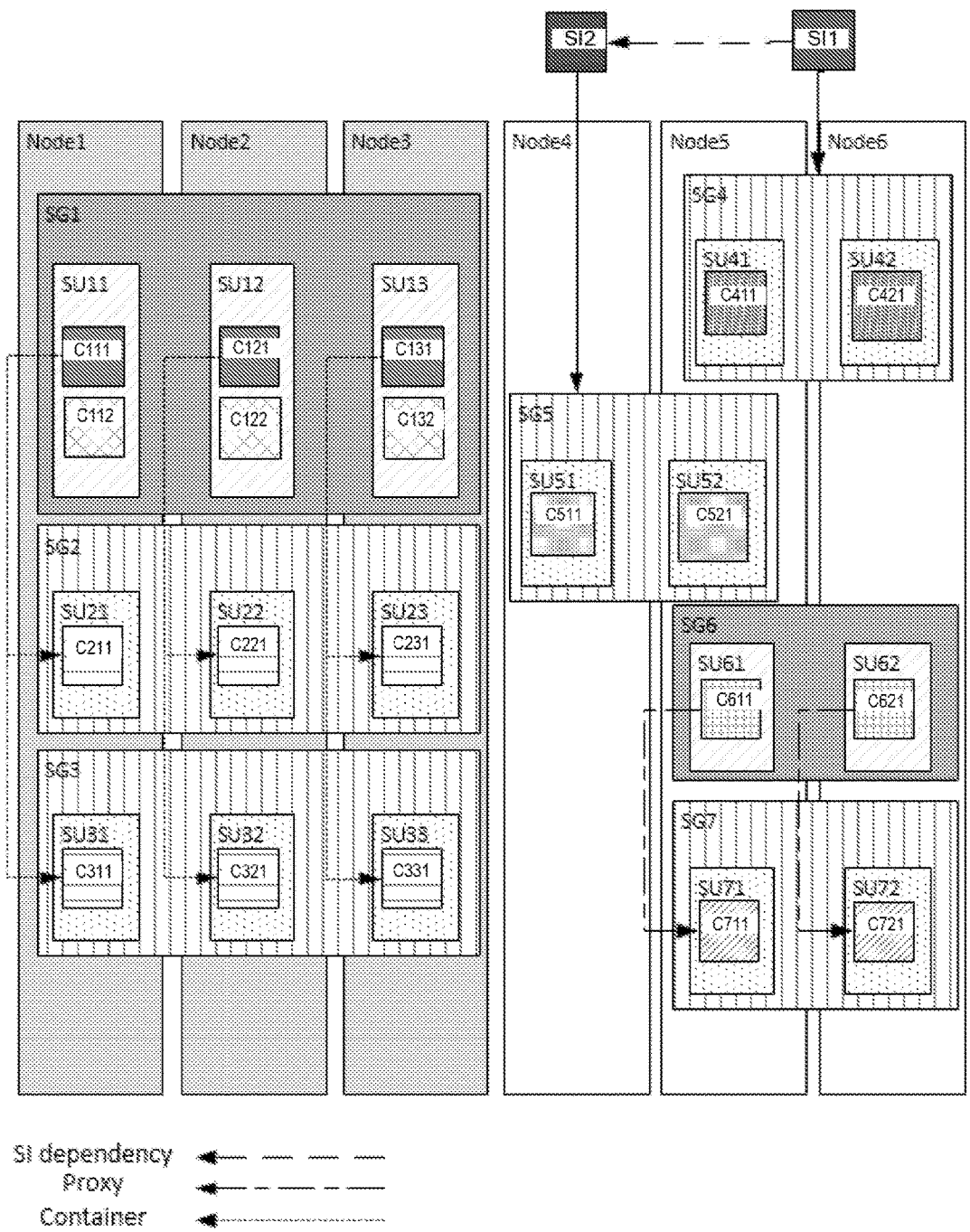
FIG. 7 illustrates an example of a partial deployment configuration according to one embodiment.

FIG. 7 illustrates a partial deployment configuration according to one embodiment. On the left hand side, there is one Node Group (NG1) on which three SGs (SG1, SG2, and SG3) are deployed. Each one of these SGs has three SUs, and the components of the SUs of SG2 and SG3 are contained by the first components of the SUs of SG1. This part of the configuration has the following kinds of dependencies:

NodeGroup collocation dependency between SG1, SG2, and SG3, as they are allocated to the same three nodes Node1, Node2 and Node3 that form the node group NG1.

SU collocation dependency between components of the same SU of SG1, e.g. C111 and C112 in SU11.

Service protection dependency between SUs of the same SG, e.g. SU11, SU12 and SU13 of SG1.

Container-Contained dependency of the components of the SUs of SG1, which are the containers for the contained components of the SUs of SG2 and SG3. These dependencies are indicated by dotted arrows in FIG. 7.

Container collocation dependency between the components of the SUs of SG2 and SG3, as they are hosted by the same set of containers.

Peer dependency between components of the same type in the same SG, i.e. between C111, C112, C113 for SG1, between C211, C212, C213 for SG2, and between C311, C312, C313 for SG3 in FIG. 7.

The right hand side of FIG. 7 shows SG4, SG5, SG6, and SG7, for which the SUs are configured per Node. This part of the deployment configuration provides examples of additional dependencies:

SI dependency: Service group SG4 protects SI1, which is shown by a solid arrow. SI1 depends on SI2 and indicated by a dashed arrow. SI2 is protected by SG5.

Proxy-proxied dependency: SG6 contains components that proxy (a.k.a. sponsor) other components within SG7, i.e. the dependents, which are also indicated by dashed arrows.

Node collocation dependency between SUs configured for the same Node (e.g. SU41, SU52, SU61, and SU71).

Figure 8:
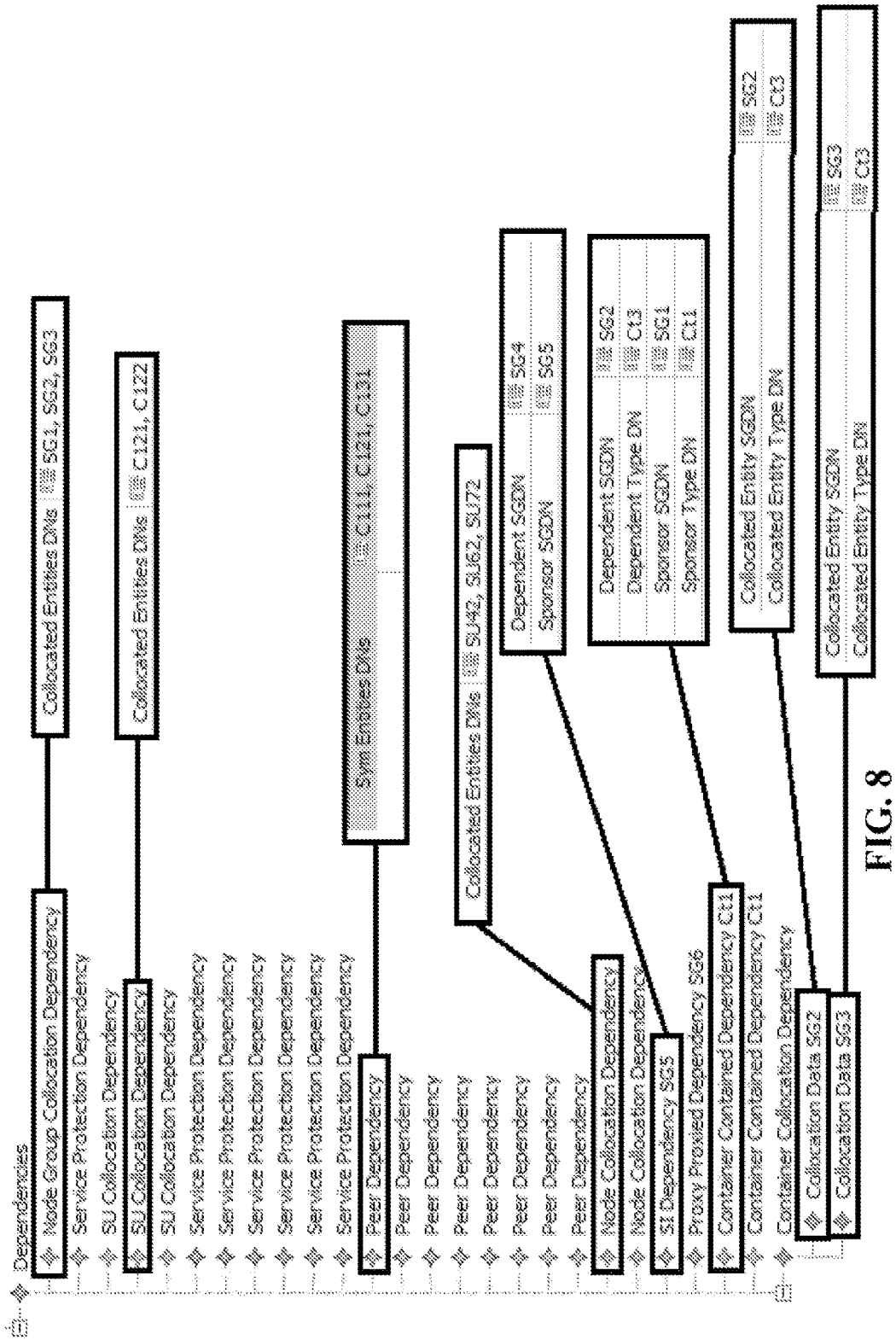
FIG. 8 illustrates an example of a dependencies model according to one embodiment.

FIG. 8 illustrates a dependencies model 800, which is an instance of the dependencies metamodel 600 of FIG. 6, according to one embodiment. The dependencies model 800 describes the dependencies in the configuration of FIG. 7. A number of attributes of selected dependency instances are emphasized in bold outlines; these attributes are used to describe each type of dependency and their different participants.

Referring back to FIG. 1, in one embodiment, the change model creation 120 consists of comparing the source and target configurations and identifying the changes between them. The set of identified changes indicates the actions to be performed to take the system from the source configuration to the target configuration.

In some cases, the source and the target configurations may not use the same names for the entities. It is assumed in this disclosure that at least the SIs, which are provided before, after and throughout the upgrade, have the same name in the source and target configurations, or the mapping between them is provided as input for the change calculation.

Starting with this assumption, the configuration objects representing the provider entities of each SI in each of the configurations are identified, and they (i.e. their names) are mapped to each other in each of the configurations. Thus, a consistent naming of configuration objects is created using the matched names from the source configuration. Matched configuration objects represent the same entity in the system before and after the upgrade; thus, the configuration objects are mapped to each other and form a pair. Next, each pair of the mapped configuration objects, i.e. their attributes and their associations, are compared. If the configuration of the represented entities, their types, attributes and associations are identical in the two configurations, then they are not targeted by the upgrade and are not considered any further.

Mapped configuration objects that represent entities whose attributes, types or associations change between the two configurations are the AMF entities targeted for modification in the upgrade process. Based on the differences between the mapped configuration objects, the appropriate AMFEntity objects and their ModifyImm changes are added to the change model. If there is a type change, the following may also need to be added to the change model: new AMFEntityType objects associated with the AddToImm and SwInstallation changes, old AMFEntityType object associated with the RemoveFromImm and SwRemoval changes, or AMFEntityType objects associated with ModifyImm change for any modified type.

Figure 9:
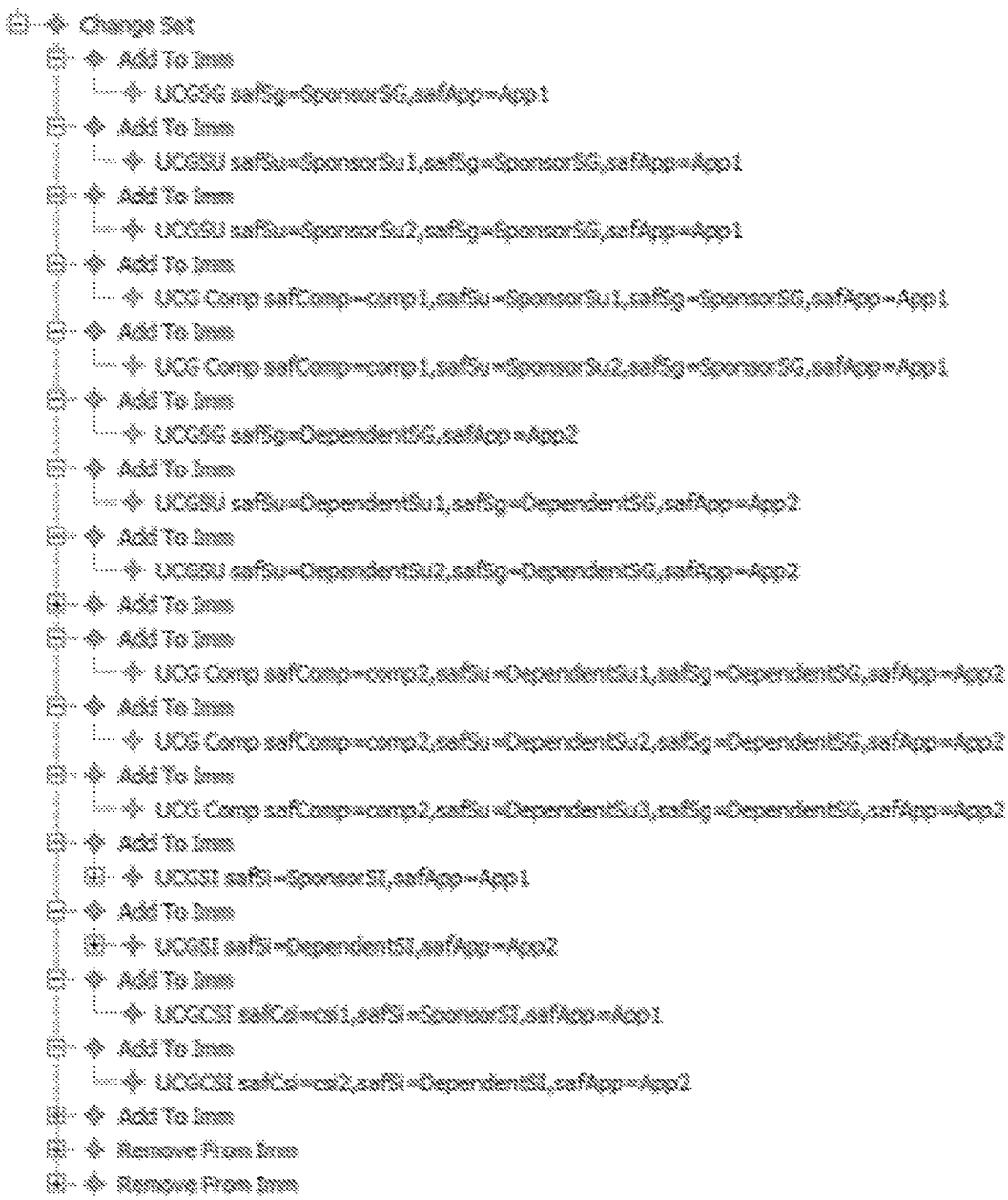
FIG. 9 illustrates an example of a change model according to one embodiment.

For configuration objects (AMF entities, AMF types and objects of association classes) that are present only in the source configuration, the appropriate AMFEntity and/or AMFType objects, RemoveFromImm and SwRemoval changes are added to the change model. Since these configuration objects are not present in the target configuration, they are removed from the system. On the other hand, for configuration objects that are present only in the target configuration, the appropriate AMFEntity and/or AMFType objects, the AddToImm and SwInstallation changes are added to the change model as necessary. The result of the change model creation 120 is an instance of the change metamodel 500 of FIG. 5. FIG. 9 illustrates an example of a change model according to one embodiment.

Referring to FIG. 1, in one embodiment, the actions creation 130 takes the change model as input and outputs an elementary upgrade campaign specification model which contains at least one upgrade campaign element for each change in the change model. The upgrade campaign elements represent upgrade actions executed at a particular time during the upgrade. The upgrade campaign elements are created according to the standard upgrade campaign schema and they respect the logic described in the SAF specifications. This means that in the transformation process the generated upgrade actions are placed in the correct sections of the upgrade campaign specification. Some parts of the upgrade campaign specification (e.g. initialization, wrap-up) explicitly specify the upgrade actions and their targets, while other parts (e.g. upgrade step) have pre-defined standard actions which are parametrized in the upgrade campaign specification. More specifically, the upgrade actions composing an upgrade step has been defined by the standard; therefore, there is no need to specify these actions in the upgrade campaign specification. By "parametrization" of the upgrade step, it means that it is sufficient for the upgrade campaign specification to specify the target entities of the pre-defined standard actions. For example, suppose that the pre-defined first action of an upgrade step is the online installation. The upgrade campaign specification will specify what software bundle is to be installed and on which nodes, but does not need to specify the online installation action.

For the initialization and wrap-up, the upgrade campaign specification includes all the actions in the order that the actions are to be executed, and with the target entities (or objects) of the actions. For example, if a new node is to be added to a node group in the configuration, then the upgrade campaign specification will specify the node addition as an ModifyImm operation on the NodeGroup configuration object, for example, in the wrap-up section of the upgrade procedure. Thus, the same action (e.g. AddToImm) may result in different upgrade campaign elements depending on the part of the campaign it is specified to be executed.

The resulting elementary upgrade campaign specification model is not yet fully compliant to the model of the standard upgrade campaign specification schema, as at this stage some schema elements are only partially defined, e.g. an upgrade procedure may only have an initialization and/or a wrap-up section, but not a body.

In the change metamodel 500 (FIG. 5) and therefore in the change model also, it is distinguished whether the target of an IMM operation is related to an AMF entity type or an AMF entity. The distinction is made such that these operations can be placed in the correct sections of the upgrade campaign specification as indicated in Table 1. Another aspect of respecting the logic of SAF specifications stipulates the need of preparing for an upgrade action that implements a change before performing it, e.g. an SI is first locked before it can be removed.

Table 1 summarizes the set of transformation rules of changes into upgrade campaign elements. It indicates for each possible change of the change model (rows), the corresponding upgrade actions (cells) and the section of the upgrade campaign specification (columns) in which upgrade actions are to be placed. The latter two together (cell and its corresponding column) form an upgrade campaign element.

TABLE 1

Mapping changes to corresponding SAF compliant actions and their positions

| | Campaign initialization | Procedure initialization | Procedure body | Procedure wrap up | Campaign wrap up |
|---|---|---|---|---|---|
| Software installation | Add software bundle to IMM | | Software installation | | |
| Software removal | | | Software removal | | Remove software bundle from IMM |
| Add type | Add type to IMM | | | | |
| Remove type | | | | | Remove type from IMM |
| Add SI | | Add SI in locked state | | Unlock SI | |
| Remove SI | | Lock SI | | Remove SI | |
| Modify SI | | Lock SI, modify SI | | Unlock SI | |
| Add SU, Node, or Comp | | | Add entity in AU | | |
| Remove SU, Node, or Comp | | | Remove entity in DU | | |
| Modify SU, Node, or Comp | | | Modify entity in symmetric AU | | |
| Add/modify other entities | | Additions or modification | | | |
| Remove other entities | | | | removal | |

The modification of types and AMF associations is not a straightforward task, with respect to how to perform a modification and where to place the modification to keep the configuration consistent. A problem that often arises with type modifications is when there are peer (a.k.a. collaborating redundant) entities operating under different type configurations during the upgrade. To be able to handle this kind of changes, the relevant attributes of the types and associations are classified into three categories as shown in Table 2. The three categories are: "set Max before", "set Min before" and "add first, remove later". Each category is treated differently:

Attributes of the third category are sets; as preparation they are extended to form a union of the source and target configuration before the upgrade of the related entities such that the entities are able to operate in both old and new configuration. Later on after all related entities have been upgraded, only the desired target configuration is kept and the others are removed.

With respect to the placement of the IMM type modification actions, these actions can be categorized into two kinds. (1) Modification of the type of the entity being upgraded: In this case, the IMM modification action is placed in the initialization of the procedure to prepare for the

TABLE 2

Types and AMF Associations Attributes Handling Strategies

| Class | Attribute | Set Max before | Set Min before | Add first, remove later |
|---|---|---|---|---|
| SaAmfSGType | saAmfSgtValidSuTypes | | | X |
| | saAmfSgtDefCompRestartProb | X | | |
| | saAmfSgtDefCompMaxRestart | X | | |
| | saAmfSgtDefSuRestartProb | X | | |
| | saAmfSgtDefSuMaxRestart | X | | |
| SaAmfSUType | saAmfSutProvidesSvcTypes | | | X |
| SaAmfSutCompType | saAmfSutMaxNumComponents | X | | |
| | saAmfSutMinNumComponents | | X | |
| SaAmfSvcType | saAmfSvcDefActiveWeight | X | | |
| | saAmfSvcDefStandbyWeight | X | | |
| SaAmfSIDependency | saAmfToleranceTime | X | | |
| SaAmfSvcTypeCSTypes | saAmfSvctMaxNumCSIs | X | | |
| SaAmfCompType | saAmfCtDefClcCliTimeout | X | | |
| | saAmfCtDefCallbackTimeout | X | | |
| | saAmfCtDefInstantiationLevel | X | | |
| SaAmfCtCSType | saAmfCtDefNumMaxActiveCSIs | | X | |
| | saAmfCtDefNumMaxStandbyCSIs | | X | |
| SaAmfCompCsType | saAmfCompNumMaxActiveCSIs | | X | |
| | saAmfCompNumMaxStandbyCSIs | | X | |

For the attributes with the "set Max before" category, to prepare for the upgrade, the changed attribute is set to the maximum of the old and new values. An action is added to set the attribute to the new value after upgrading the associated entities to complete the change.

For the attributes with the "set Min before" category, as preparation the value of the changed attribute is set to the minimum of the new and old values. The new value is set after upgrading the entities.

upgrade (e.g. the set Max before). The rest of the modifications is placed in the wrap-up section of the same procedure. (2) Modification of the type of a sponsor or a dependent entity: The IMM modifications are placed in the initialization and the wrap-up sections of an independent procedure specifically ordered with respect to the procedure operating on the entity being upgraded based on compatibility Referring to FIG. 1, in one embodiment, the actions matching 140 transformation refines the elementary upgrade campaign specification model generated by the actions creation 130 transformation by matching the upgrade campaign elements that can be performed in the same procedure, and merging the matched elements into a single upgrade procedure. After this matching transformation, the upgrade campaign specification model is fully compliant to the model of the standard upgrade campaign specification schema.

Referring also to FIG. 2, the actions matching 140, which corresponds to the matching and merging module 240, follows the first set of rules 241 when performing the matching and merging operations. In one embodiment, the first set of rules 241 includes one or more of the following:

Rule #1: Upgrade actions on peer entities match, which means that upgrade campaign elements on redundant entities can be matched and merged into the same procedure, e.g. a single rolling upgrade procedure. For example, upgrade campaign elements for SUs of the same SG match; thus, the upgrade campaign elements are merged into a rolling upgrade procedure.

Rule #2: Upgrade actions on entities match upgrade actions on their children, which means that the upgrade campaign elements with upgrade actions on a parent and on its child can be matched and merged into the same upgrade procedure. For example, the upgrade of an SU and its component match, and their upgrade campaign elements are merged together into the same upgrade procedure.

Rule #3: Upgrade actions on entities match upgrade actions on software bundles providing the entities' types, or the types of the entities' matching entities. This means that the upgrade campaign elements with the modifications of entities and with the installation/removals of software associated with these modifications can be matched and merged into the same upgrade procedure. For example, the upgrade of a component and the installation of the software bundle delivering its component type match, and they are merged into the same upgrade procedure.

Rule #4: Upgrade actions on services match upgrade actions on entities protecting those services, which means that any modification of a service entity (SI or CSI) matches the modifications on their service provider entities (SU or component). Thus, these modifications can be merged into the same upgrade procedure. For example, a modification of an SI matches the modifications on the SUs of the SG protecting the SI, and they are merged into the same upgrade procedure.

Rule #5: The matching of actions on associations has four sub-cases:

Type to Type associations: They are not matched since their upgrade campaign elements have been placed in the campaign initialization or wrap-up section.

Type to Entity associations: They are matched to the upgrade actions performed on the entity, i.e. the upgrade procedure performing the entity upgrade. If the association is added, it is placed in the wrap-up section of the procedure. If it is removed, then it is placed in the initialization section.

1:1, one to one, associations: For addition, such an association is matched to the last added entity and placed in the wrap-up section of its upgrade procedure, as both end points of the association need to exist. For removal, such an association is matched to the first removed entity and placed in the initialization its upgrade procedure, as the association ceases as soon as any of its end points ceases.

1:N, one to N, associations, wherein N is greater than or equal to one: For addition, such an association is matched to the first added entity of the second end point of the association and put in the wrap-up section of its upgrade procedure, i.e. the association exist as soon as an entity exists for each of its end points. For removal, such an association is matched to the last removed entity of the second end point of the association, and it is placed in the initialization of its upgrade procedure, i.e. the association ceases when the last entity at any of its end points ceases.

These rules, if applied in an arbitrary order, may result in the wrong matching up of upgrade actions. For instance, assume that there are two SGs with SUs of the same type protecting two SIs of the same service type. In this case, if these rules are applied in the wrong order that might result in the matching of actions on SUs of the first SG with actions on SUs of the second SG, i.e. if Rule #3 is applied first. Therefore, another rule is added to the first set of rules 241, stating that Rules #1, #2, and #3 are applied in that order, while the remaining rules can be applied in any order.

Referring to FIG. 1, in one embodiment, the ordering and scope optimization 150 transformation takes into consideration the dependencies extracted from the source and target configurations to determine the appropriate ordering of the execution of the different upgrade procedures. The dependencies have been categorized and a set of ordering rules has been defined for them to minimize service outage during the execution of the upgrade campaign. In one embodiment, the set of ordering rules is shown in FIG. 2 as the second set of rules 281. The ordering rules apply to the directed dependencies and to the service protection dependency. The rules for the directed dependencies are summarized in Table 3.

TABLE 3

Execution ordering of changes for sponsor and dependent entities

| Change on sponsor | Change on dependent | Ordering rule |
|---|---|---|
| Addition | Addition | Sponsor first |
| Removal | Removal | Dependent first |
| Addition | modification | Sponsor first |
| modification | Addition | Sponsor first |
| modification | modification | Depending on compatibility |
| Removal | modification | Dependent first |
| Modification | Removal | Dependent first |

For the service protection dependency, the order rules include the following: First additions (if any) followed by modifications of existing entities, and then removals (if any). For example, adding a SU to a SG or a component to a SU is done before modifying (upgrading) the existing SUs of the SG or the existing components of the SU. On the other hand, removing a SU from a SG or a component from a SU is executed after modifying (upgrading) the existing entities.

The ordering rules impose an order that enables the changes to be performed on the system without violation of the different dependencies between its building blocks and services. However, these rules may not be sufficient to optimize the upgrade campaign specification. To optimize the upgrade campaign specification, the following factors are taken into account to minimize service disruption and outage:

The choice of scope of impact of the upgrade actions: The entities taken out of service for the upgrade action are referred as deactivation unit (DU). For one upgrade action only one DU is taken out of service, but that DU may contain multiple entities. A DU can be composed from the entities in such a way that there is no service outage (e.g. because of redundant entities) when the DU is taken out of service. The entities that are put back into service after the upgrade action are referred to as activation unit (AU). The sizes of AU and DU directly influence the impact of the upgrade scope.

The choice of the upgrade method: An upgrade procedure of the single step method takes out of service all the associated entities, while the rolling upgrade method splits the associated entities to multiple DU/AU pairs based on the redundancy of the entities.

The ease of roll back: The ordering considerations are extended such that an upgrade action with a higher risk to fail is performed earlier in the upgrade campaign. Thus, the campaign is more likely to fail in earlier stages of its execution, which in turn reduces the likelihood of rollback failure by minimizing the amount of successful changes to be rolled back.

In one embodiment, a number heuristics may be used to optimize an upgrade campaign specification with respect to the aforementioned factors. Note that for AMF, the Node has the biggest scope of impact, followed by the Container, then the SU, and the Component has the smallest scope of impact.

Heuristic #1: Keep the AU/DU as small as possible, meaning that the AU/DU will be the largest scope of impact of the software bundles for the installation and removal operations. If the upgrade consists of only IMM modifications, then the AU/DU is bounded to the modification scope. For example, if an SU is to be modified, there is no need to lock the Node.

Heuristic #2: Place as many changes as possible in an upgrade procedure that has a bigger scope of impact. This applies to procedures that have a scope of impact that are subset of this largest scope of impact. For example, if an upgrade procedure for a contained component has the scope of impact of the Container, all collocated contained component can be upgraded in the same procedure.

Heuristic #3: Procedures with bigger scopes of impact are scheduled to be executed as early as possible. This heuristics is based on the assumption that a bigger scope of impact captures more things that can go wrong during upgrade.

Heuristic #4: An execution level contains procedures of the same scope of impact. This heuristics makes the synchronization easier and less error prone as procedures of the same execution level can be executed in any order including simultaneous execution.

Accordingly, a model driven approach for generating an upgrade campaign has been described. The complexity of designing an optimal upgrade campaign stems from the size of the system, and the different relationships and dependencies between the involved domain concepts. A number of metamodels have been designed to capture the system upgrade domain concepts. The model driven approach increases the level of abstraction, links the different metamodels, and generates an optimized upgrade campaign that incurs minimal service outage at campaign execution.

Figure 10:
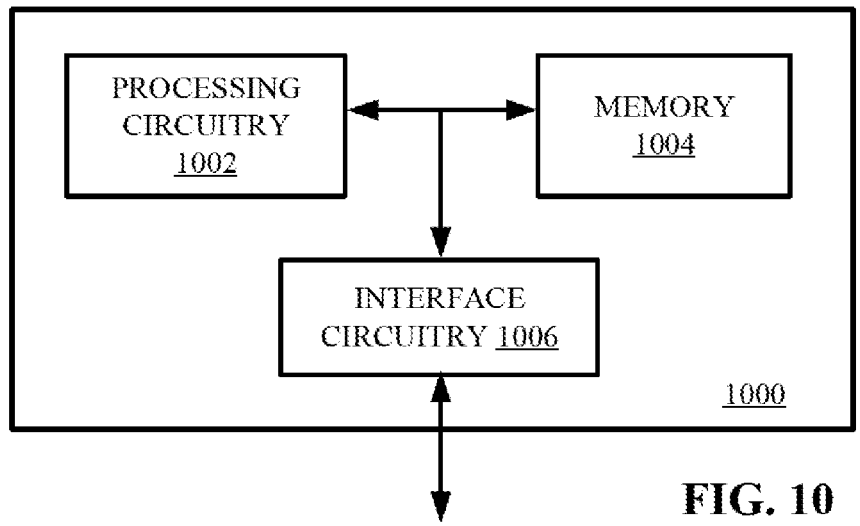
FIG. 10 is a block diagram of a system or network node according to one embodiment.

FIG. 10 is a block diagram illustrating a system 1000 according to an embodiment. In one embodiment, the system 1000 may be a network node or server in an operator network or in a data center. The system 1000 includes circuitry including processing circuitry 1002, a memory or instruction repository 1004 and interface circuitry 1006. The interface circuitry 1006 can include at least one input port and at least one output port. The memory 1004 contains instructions executable by the processing circuitry 1002 whereby the system 1000 is operable to perform the various embodiments as described herein, including the method 300 of FIG. 3.

Figure 11:
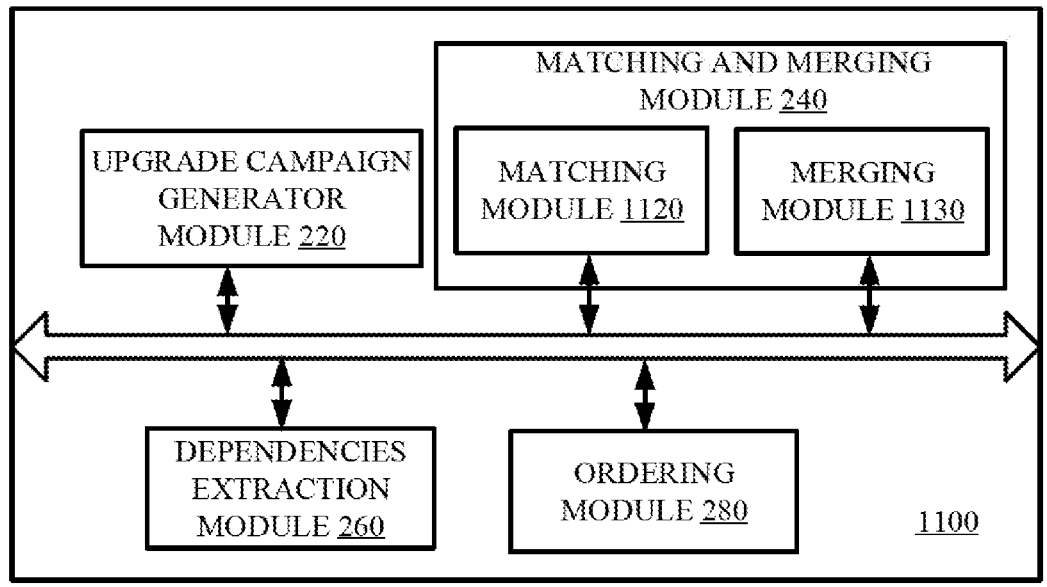
FIG. 11 is a block diagram of another network node according to one embodiment.

FIG. 11 is a block diagram of an example system 1100 that includes a number of modules. In one embodiment, the system 1100 may be a network node or server. The system 1100 generates an upgrade campaign for entities of a system described by a source configuration to upgrade the system to a target configuration using available software. Referring also to FIG. 2, the system 1100 comprises the upgrade campaign generator module 220, the matching and merging module 240 which further comprises a matching module 1120 and a merging module 1130, the dependencies extraction module 260 and the ordering module 280. The upgrade campaign generator module 220 is adapted to generate an upgrade campaign specification model to describe the upgrade campaign according to a change model which describes changes from the source configuration to the target configuration, wherein the upgrade campaign specification model contains at least one upgrade campaign element for each change in the change model. The matching module 1120 is adapted to match a subset of upgrade campaign elements based on a first set of rules to form one or more matched groups of upgrade campaign elements. The merging module 1130 is adapted to merge each matched group of upgrade campaign elements into an upgrade procedure in the upgrade campaign specification model. The dependencies extraction module 260 is adapted to extract dependencies among the entities of the system from the source configuration, the target configuration and the description of available software. The ordering module 280 is adapted to order the upgrade procedures based on the extracted dependencies and a second set of rules. The system 1100 can be configured to perform the various embodiments as have been described herein.

Figure 12:
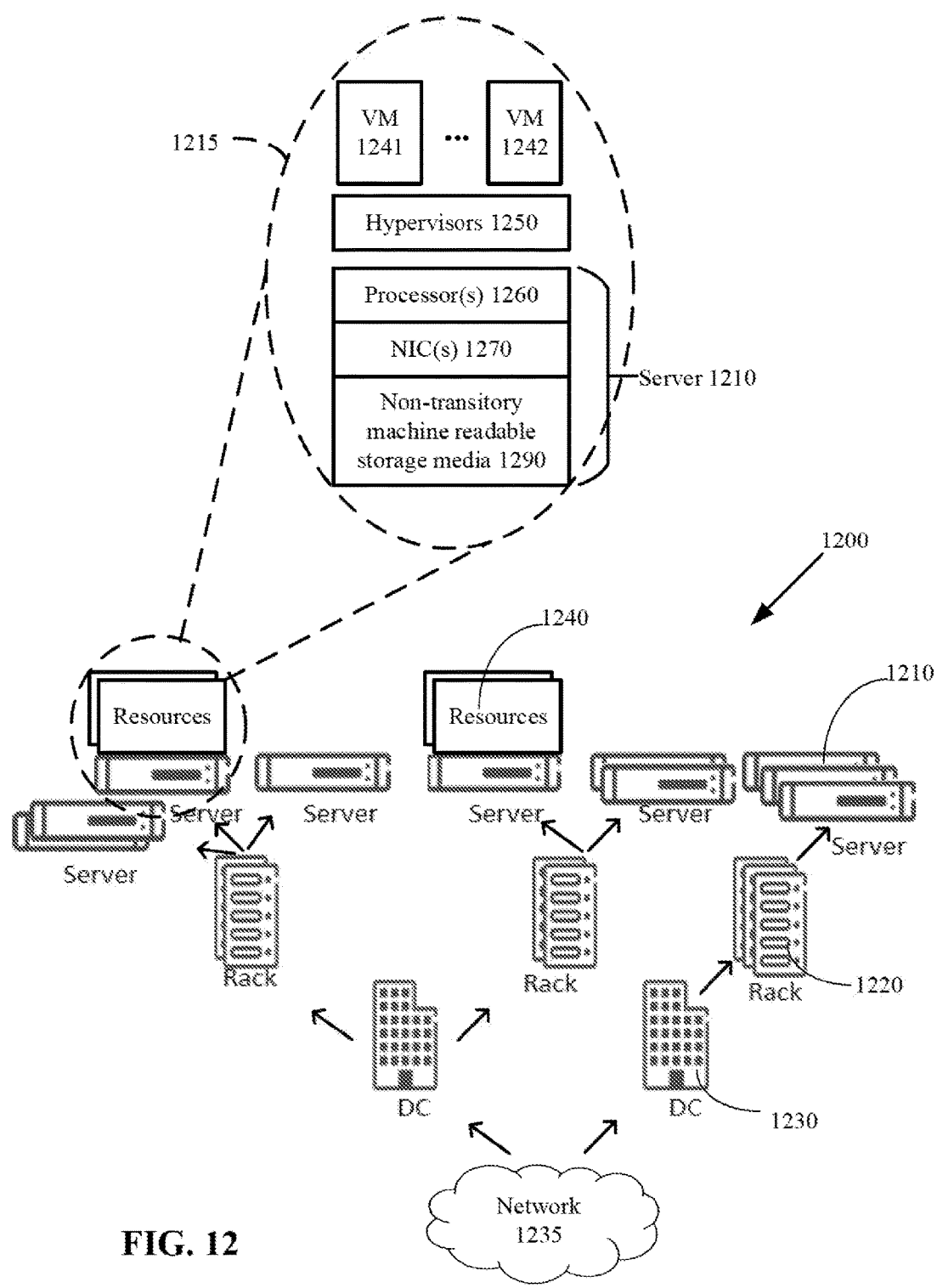
FIG. 12 is an architectural overview of a cloud computing environment according to one embodiment.

FIG. 12 is an architectural overview of a cloud computing environment 1200 that comprises a hierarchy of a cloud computing entities. The cloud computing environment 1200 can include a number of different data centers (DCs) 1230 at different geographic sites connected over a network 1235. Each data center 1230 site comprises a number of racks 1220, each rack 1220 comprises a number of servers 1210. It is understood that in alternative embodiments a cloud computing environment may include any number of data centers, racks and servers. A set of the servers 1210 may be selected to host resources 1240. In one embodiment, the servers 1210 provide an execution environment for hosting entities and their hosted entities, where the hosting entities may be service providers and the hosted entities may be the services provided by the service providers. The server 1210 and its resources 1240, as well as the hosting and hosted entities provided by the server 1210, may be upgraded according to the various embodiments as have been described herein.

Further details of the server 1210 and its resources 1240 are shown within a dotted circle 1215 of FIG. 12, according to one embodiment. The cloud computing environment 1200 comprises a general-purpose network device (e.g. server 1210), which includes hardware comprising a set of one or more processor(s) 1260, which can be commercial off-the-shelf (COTS) processors, dedicated Application Specific Integrated Circuits (ASICs), or any other type of processing circuit including digital or analog hardware components or special purpose processors, and network interface controller(s) 1270 (NICs), also known as network interface cards, as well as non-transitory machine readable storage media 1290 having stored therein software and/or instructions executable by the processor(s) 1260.

During operation, the processor(s) 1260 execute the software to instantiate a hypervisor 1250 and one or more VMs 1241, 1242 that are run by the hypervisor 1250. The hypervisor 1250 and VMs 1241, 1242 are virtual resources, which may run server instances in this embodiment. In one embodiment, the server instance may be implemented on one or more of the VMs 1241, 1242 that run on the hypervisor 1250 to perform the various embodiments as have been described herein.

In an embodiment the server instance instantiation can be initiated by a user 1300 or by a machine in different manners. For example, the user 1300 can input a command, e.g. by clicking a button, through a user interface to initiate the instantiation of the server instance. The user 1300 can alternatively type a command on a command line or on another similar interface. The user 1300 can otherwise provide instructions through a user interface or by email, messaging or phone to a network or cloud administrator, to initiate the instantiation of the server instance.

Embodiments may be represented as a software product stored in a machine-readable medium (such as the non-transitory machine readable storage media 1290, also referred to as a computer-readable medium, a processor-readable medium, or a computer usable medium having a computer readable program code embodied therein). The non-transitory machine-readable medium 1290 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software miming from the machine-readable medium may interface with circuitry to perform the described tasks.

The above-described embodiments are intended to be examples only. Alterations, modifications and variations may be effected to the particular embodiments by those of skill in the art without departing from the scope which is defined solely by the claims appended hereto.

What is claimed is:

1. A method for managing a high availability system by generating an upgrade campaign representing a process of migrating the system from one configuration to another, the upgrade campaign being generated for entities of the system described by a source configuration to upgrade the system to a target configuration using available software, the method being performed by a network node and comprising:
generating an upgrade campaign specification model to describe the upgrade campaign according to a change model which describes changes from the source configuration to the target configuration, wherein the upgrade campaign specification model contains at least one upgrade campaign element for each change in the change model, an upgrade campaign element representing an upgrade action to be executed at a particular time during the upgrade;
refining the upgrade campaign specification model by:
matching a subset of upgrade campaign elements based on a first set of rules to form one or more matched groups of upgrade campaign elements;
merging each matched group of upgrade campaign elements into an upgrade procedure in the upgrade campaign specification model;
extracting dependencies among the entities of the system from the source configuration, the target configuration and a description of available software;
ordering the upgrade procedures based on the extracted dependencies and a second set of rules; and
executing the upgrade in accordance with the refined upgrade campaign specification model.

2. The method of claim 1, wherein each of the generating, matching, merging, extracting and ordering is performed by transforming models, which include a dependencies model compliant with a dependencies metamodel, the change model compliant with a change metamodel, and the upgrade campaign specification model compliant with an upgrade campaign specification metamodel.

3. The method of claim 2, wherein the dependencies metamodel categorizes the dependencies into categories based on attributes of the entities and how the entities are to be deployed in the system, the categories including directed dependencies between a dependent entity and another entity being depended on, symmetric dependencies between entities that depend on each other, and collocation dependencies between entities that are collocated on a same entity.

4. The method of claim 2, wherein the change metamodel includes information model related changes which further include changes to entities, entity types and associations, and software related changes which further include software installation and removal.

5. The method of claim 1, wherein generating the upgrade campaign specification model further comprises:
mapping each change in the change model into one or more upgrade actions; and
mapping each upgrade action into at least one of a campaign initialization section, a procedure initiation section, a procedure body section, a procedure wrap-up section, and a campaign wrap-up section.

6. The method of claim 1, wherein a modification of an attribute of a type or an association is categorized into one of three categories including: a first category which sets a changed attribute to a maximum of an old value and a new value, a second category which sets the changed attribute to a minimum of the old value and the new value, and a third category which forms a union of the source configuration and the target configuration before an upgrade and keeps only the target configuration after the upgrade.

7. The method of any one of claim 1, wherein the first set of rules comprises one or more of:
a first rule of matching upgrade actions on peer entities, a second rule of matching upgrade actions on entities and the entities' children, a third rule of matching upgrade actions on entities and software bundles providing the entities' types, a fourth rule of matching upgrade actions on services and entities protecting the services, and a fifth rule of matching upgrade actions on associations except for type to type associations.

8. The method of claim 7, further comprising:
applying the first rule, followed by the second rule, and then followed by the third rule.

9. The method of claim 7, wherein the associations in the fifth rule includes type to entity association, 1 to 1 association and 1 to N associations, where N is greater than or equal to one.

10. The method of claim 1, wherein ordering the upgrade procedures further comprises:
applying the second set of rules based on the changes to be performed and whether the changes are to be performed on the entities that have directed dependency or service protection dependency.

11. The method of claim 1, further comprising:
optimizing upgrade scopes of the upgrade procedures by applying one or more heuristics including: a first heuristic of minimizing an activation unit and a deactivation unit used in each upgrade procedure, a second heuristic of placing more changes in a first upgrade procedure than in a second upgrade procedure which has a smaller scope of impact than the first upgrade procedure, a third heuristic of executing the first upgrade procedure earlier than the second upgrade procedure, and a fourth heuristic of executing the upgrade procedures having a same scope of impact in any order including simultaneous execution.

12. A network node comprising processing circuitry and memory, said memory containing instructions executable by said processing circuitry to manage a high availability system by generating an upgrade campaign representing a process of migrating the system from one configuration to another, the upgrade campaign being generated for entities of the system described by a source configuration to upgrade the system to a target configuration using available software, whereby said network node is operative to:
generate an upgrade campaign specification model to describe the upgrade campaign according to a change model which describes changes from the source configuration to the target configuration, wherein the upgrade campaign specification model contains at least one upgrade campaign element for each change in the change model an upgrade campaign element representing an upgrade action to be executed at a particular time during the upgrade;
refine the upgrade campaign specification model by:
match subset of upgrade campaign elements based on a first set of rules to form one or more matched groups of upgrade campaign elements;
merge each matched group of upgrade campaign elements into an upgrade procedure in the upgrade campaign specification model;
extract dependencies among the entities of the system from the source configuration, the target configuration and a description of available software;
order the upgrade procedures based on the extracted dependencies and a second set of rules; and
execute the upgrade in accordance with the refined upgrade campaign specification model.

13. The network node of claim 12, wherein the network node is operative to generate, match, merge, extract and order by transforming models, which include a dependencies model compliant with a dependencies metamodel, the change model compliant with a change metamodel, and the upgrade campaign specification model compliant with an upgrade campaign specification metamodel.

14. The network node of claim 13, wherein the dependencies metamodel categorizes the dependencies into categories based on attributes of the entities and how the entities are to be deployed in the system, the categories including directed dependencies between a dependent entity and another entity being depended on, symmetric dependencies between entities that depend on each other, and collocation dependencies between entities that are collocated on a same entity.

15. The network node of claim 13, wherein the change metamodel includes information model related changes which further include changes to entities, entity types and associations, and software related changes which further include software installation and removal.

16. The network node of claim 12, wherein the network node when generating the upgrade campaign specification model is further operative to:
map each change in the change model into one or more upgrade actions; and
map each upgrade action into at least one of a campaign initialization section, a procedure initiation section, a procedure body section, a procedure wrap-up section, and a campaign wrap-up section.

17. The network node of claim 12, wherein a modification of an attribute of a type or an association is categorized into one of three categories including: a first category which sets a changed attribute to a maximum of an old value and a new value, a second category which sets the changed attribute to a minimum of the old value and the new value, and a third category which forms a union of the source configuration and the target configuration before an upgrade and keeps only the target configuration after the upgrade.

18. The network node of claim 12, wherein the first set of rules comprises one or more of:
a first rule of matching upgrade actions on peer entities, a second rule of matching upgrade actions on entities and the entities' children, a third rule of matching upgrade actions on entities and software bundles providing the entities' types, a fourth rule of matching upgrade actions on services and entities protecting the services, and a fifth rule of matching upgrade actions on associations except for type to type associations.

19. The network node of claim 18, wherein the network node is further operative to:
apply the first rule, followed by the second rule, and then followed by the third rule.

20. The network node of claim 18, wherein the associations in the fifth rule includes type to entity association, 1 to 1 association and 1 to N associations, where N is equal to or greater than one.

21. The network node of claim 12, wherein the network node when ordering the upgrade procedures is further operative to:
apply the second set of rules based on the changes to be performed and whether the changes are to be performed on the entities that have directed dependency or service protection dependency.

22. The network node of claim 12, wherein the network node is further operative to:
optimize upgrade scopes of the upgrade procedures by applying one or more heuristics including: a first heuristic of minimizing an activation unit and a deactivation unit used in each upgrade procedure, a second heuristic of placing more changes in a first upgrade procedure than in a second upgrade procedure which has a smaller scope of impact than the first upgrade procedure, a third heuristic of executing the first upgrade procedure earlier than the second upgrade procedure, and a fourth heuristic of executing the upgrade procedures having a same scope of impact in any order including simultaneous execution.

23. A server instance in a cloud computing environment providing processing circuitry and memory, said memory containing instructions executable by said processing circuitry to manage a high availability system by generating an upgrade campaign representing a process of migrating the system from one configuration to another, the upgrade campaign being generated for entities of the system described by a source configuration to upgrade the system to a target configuration using available software, whereby said server instance is operative to:

generate an upgrade campaign specification model to describe the upgrade campaign according to a change model which describes changes from the source configuration to the target configuration, wherein the upgrade campaign specification model contains at least one upgrade campaign element for each change in the change model, an upgrade campaign element representing an upgrade action to be executed at a particular time during the upgrade;

refine the upgrade campaign specification model by:
   match subset of upgrade campaign elements based on a first set of rules to form one or more matched groups of upgrade campaign elements;
   merge each matched group of upgrade campaign elements into an upgrade procedure in the upgrade campaign specification model;
   extract dependencies among the entities of the system from the source configuration, the target configuration and a description of available software;
   order the upgrade procedures based on the extracted dependencies and a second set of rules; and executing the upgrade in accordance with the refined upgrade campaign specification model.

* * * * *